(12) United States Patent
Skerker et al.

(10) Patent No.: US 6,237,193 B1
(45) Date of Patent: May 29, 2001

(54) COMPRESSIBLE HANDLE

(75) Inventors: Robert Skerker, Buffalo; Michael Callahan, Corning, both of NY (US)

(73) Assignee: Robinson Knife Company, NY (US)

(*) Notice: Subject to any disclaimer, the term of this patent is extended or adjusted under 35 U.S.C. 154(b) by 0 days.

(21) Appl. No.: 09/260,767

(22) Filed: Mar. 2, 1999

(51) Int. Cl.$^7$ ..................................................... B25G 1/10
(52) U.S. Cl. ............................... 16/430; 16/421; 81/489; 81/177.1
(58) Field of Search ................. 16/436, 421, DIG. 12, 16/430; 30/340, 526; 81/177.1, 489, 900; 473/300, 303

(56) References Cited

U.S. PATENT DOCUMENTS

| | | | |
|---|---|---|---|
| 588,794 | * 8/1897 | Granger | 16/421 X |
| 593,162 | * 11/1897 | Miller | 74/551.9 |
| 3,206,204 | * 9/1965 | Lacoste | 16/421 X |
| 3,344,684 | * 10/1967 | Steere, Jr. et al. | 74/551.9 |
| 3,697,110 | 10/1972 | Portz et al. | 294/57 |
| 4,234,202 | * 11/1980 | Loffelholz | 16/DIG. 12 X |
| 4,380,093 | * 4/1983 | Morgan | 16/421 |
| 4,509,228 | * 4/1985 | Landsberger | 16/DIG. 12 X |
| 4,639,029 | 1/1987 | Kolonia | 294/57 |
| 4,972,733 | * 11/1990 | Olmr et al. | 81/177.1 X |
| 4,974,286 | * 12/1990 | Stowell et al. | 16/421 |
| 5,018,733 | * 5/1991 | Buand | 473/550 |
| 5,042,804 | 8/1991 | Uke et al. | 473/538 |
| 5,088,734 | 2/1992 | Glava | 473/523 |
| 5,125,130 | 6/1992 | Stanish | 16/430 |
| 5,193,246 | * 3/1993 | Huang | 16/421 X |
| 5,261,665 | 11/1993 | Downey | 473/303 |
| 5,348,360 | 9/1994 | Mencarelli et al. | 294/57 |
| 5,446,941 | 9/1995 | Kelsay | 15/235.4 |
| 5,533,768 | 7/1996 | Mitchell | 294/54.5 |
| 5,535,484 | * 7/1996 | Gibson | 16/430 |
| 5,537,688 | * 7/1996 | Reynolds et al. | 2/20 |
| 5,634,859 | 6/1997 | Nesbitt | 473/301 |
| 5,669,835 | * 9/1997 | Tiura | 473/303 X |
| 5,686,158 | * 11/1997 | Gibbon | 473/300 X |
| 5,713,096 | 2/1998 | Kelsay et al. | 15/235.4 |
| 5,713,104 | * 2/1998 | Giampaolo, Jr. | 16/422 |
| 5,771,490 | * 6/1998 | Reynolds et al. | 2/20 |
| 5,771,535 | 6/1998 | Blessing | 16/430 |
| 5,787,588 | 8/1998 | Tisbo et al. | 30/164.5 |
| 5,802,960 | 9/1998 | Graj et al. | 99/403 |
| 5,839,517 | * 11/1998 | Gwinn et al. | 173/162.2 |
| 5,845,364 | * 12/1998 | Chen | 16/436 X |
| 5,987,705 | * 11/1999 | Reynolds | 16/DIG. 12 X |
| 6,105,460 | * 8/2000 | Li | 81/177.1 X |

* cited by examiner

Primary Examiner—Anthony Knight
(74) Attorney, Agent, or Firm—Hedman & Costigan, P.C.

(57) ABSTRACT

The present invention provides a handle equipped with a cushioning member which provides improved controlled compression.

20 Claims, 4 Drawing Sheets

COMPRESSIBLE HANDLE

The present invention relates to an improved compressible handle. More particularly, the present invention relates to an improved handle for use with a wide variety of objects such as kitchen tools, hardware tools and sporting equipment. Most particularly, the present invention relates to an improvement whereby the cushioning and feel of a handle is improved.

BACKGROUND OF THE PRESENT INVENTION

There are a wide variety of objects which employ a handle to facilitate their use. These include kitchen tools, such as pots, pans, spoons, forks, mashers, spatulas, knives, tongs, and the like; hardware tools such as hammers, screwdrivers, drills, wrenches and the like; yard tools such as spades, rakes, shovels and the like; and sporting equipment such as golf clubs, tennis rackets, fishing rods, baseball bats and the like.

In the use of many of these objects, there is experienced by the user at least some degree of discomfort, and in some instances the handles are required to withstand relatively high forces due to impact with another surface. It has long been sought in the art to provide a handle which is comfortable and which is capable of reducing the shock or impact which is transmitted to the user via the handle during use and/or the fatigue associated by gripping such a device for extended period of time.

Exemplary of devices which have attempted to provide improved handles are shown in Uke et al., U.S. Pat. No. 5,042,804 (elongate single sheet of elastomeric material); Stowell et al., U.S. Pat. No. 4,974,286 (concave depression having array of spaced, flexible fins); Nesbitt, U.S. Pat. No. 5,634,859 (grip formed from hard and soft layer molded together); Kelsay, U.S. Pat. No. 5,446,941 (plastic molded trowel handle having fingerguard and palm grip); Mencarelli et al., U.S. Pat. No. 5,348,360 (replaceable cushioned contoured gripping device); Stanish, U.S. Pat. No. 5,125,130 (ergonomic handle); Blessing, U.S. Pat. No. 5,771,535 (ergonomic handle); and Graj et al., U.S. Pat. No. 5,802,960 (ergonomic cookware); among others.

None of the devices of the prior art however provide an improved compressible handle which provides both an extremely comfortable feel and significantly reduces the amount of shock or fatigue felt by the user.

Surprisingly, the device of the present invention provides significant improvements in the areas of comfort and reduction of shock and fatigue felt by the user. Broadly, the improved handle of the present invention comprises a handle shaft which comprises a resilient member, the resilient member comprised of a first layer of an elastomeric material and a second layer of elastomeric material to form therebetween an air pocket.

SUMMARY OF THE PRESENT INVENTION

To this end it is an object of the present invention to provide an improved handle.

It is a further object of the present invention to provide an improved handle which is adaptable for use with a wide variety of hand held objects.

It is another object of the present invention to provide an improved handle which provides additional comfort to the user.

It is a still further object of the present invention to provide an improved handle which is compressible.

It is still another object of the presention invention to provide an improved handle having controlled compression.

These and other objects will become known to those skilled in the art in light of the detailed description of the present invention herein.

DETAILED DESCRIPTION OF THE PREFERRED EMBODIMENTS OF THE PRESENT INVENTION

The following description of preferred embodiments of the present invention is provided for illustrative purposes only and should not be construed to limit the claims in any manner whatsoever.

The present invention is particularly suitable for use with a large variety of tools which employ a handle. These include kitchen tools such as cookware (i.e., pots and pans, etc.) and kitchen utensils (knives, spoons and spatulas, etc.), sporting equipment such as tennis rackets and golf clubs, etc., and work tools such as hammers, spades, shovel, etc.

Figure 1:
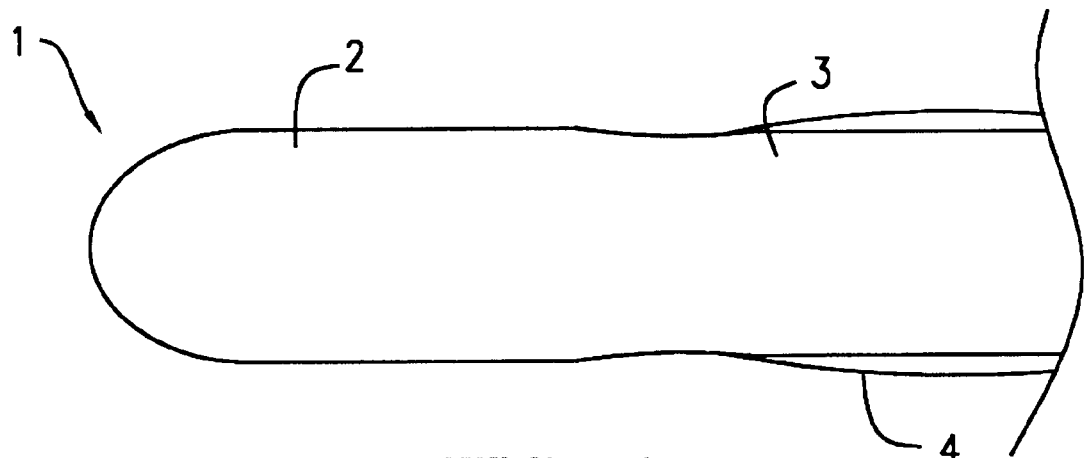
FIG. 1 shows a side view of a handle of the present invention.
Figure 2:
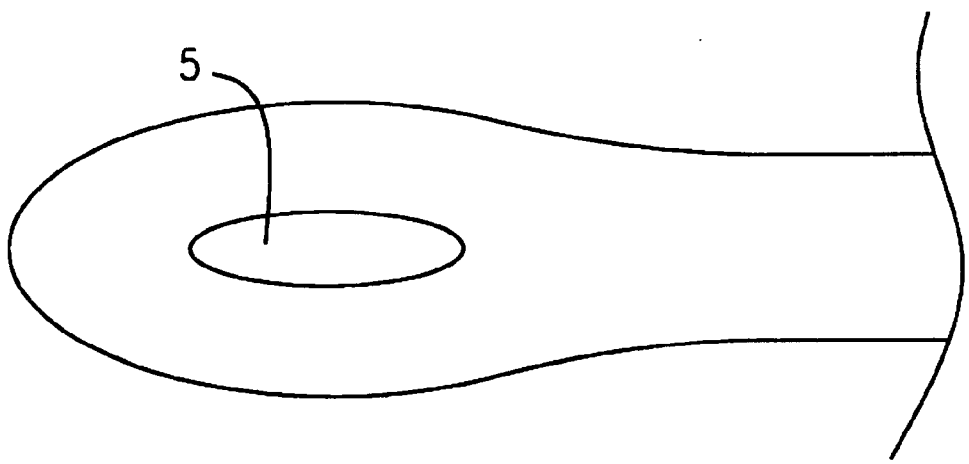
FIG. 2 shows a top view of a handle of the present invention.

Referring to FIG. 1, the present invention comprises a handle 1 which has a relatively thicker portion adapted for fitting into the palm of the user's hand 2, and a relatively thinner portion adapted for gripping by the fingers of the user's hand 3. The finger gripping portion 3 is also provided with a cushioning member 4. Referring to FIG. 2, the handle may also preferably be provided with a cutout 5 to enable the tool to be hung from a hook or the like.

Figure 3:
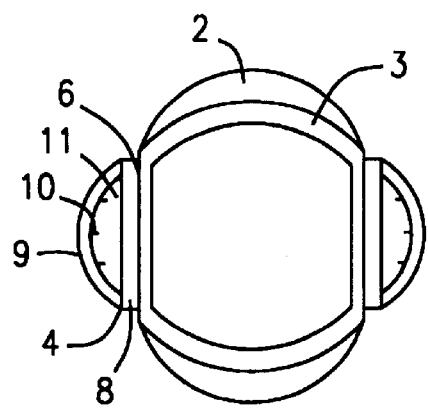
FIG. 3 shows a front end view of a handle of the present invention.

Referring to FIG. 3 which is front end view of the handle 1, there is seen the finger gripping portion 3 and the palm fitting portion 2. The handle also comprises two flat sides 6 to which are attached the cushioning members 4. The cushioning member 4 is comprised of two layers, a base layer 8 and a concave layer 9. The base layer 8 is attached to the flat portion 6 of finger gripping portion 3 of handle 1. The base layer 8 may be attached to the finger gripping portion 3 directly by molding or may be secured by a suitable adhesive as is well known to those of ordinary skill in the art.

In between the base layer 8 and concave layer 9, there is provided an air pocket 11. Concave layer 9 is preferably provided with ribs 10 which assist in maintaining the air pocket during compression of the cushioning member 4. In FIG. 3, three equispaced ribs are shown but any suitable number and/or configuration may be employed.

Figure 4:
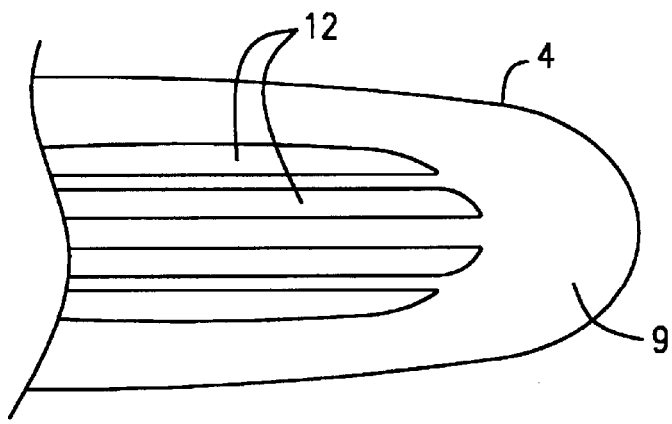
FIG. 4 shows a top view of an embodiment of a cushioning member for use on a handle of the present invention.
Figure 5:
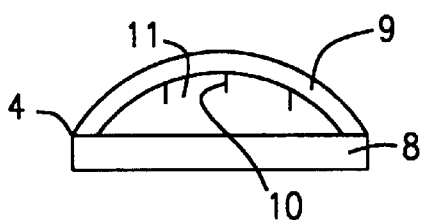
FIG. 5 shows a cross sectional view of an embodiment of a cushioning member for use on a handle of the present invention.
Figure 6:
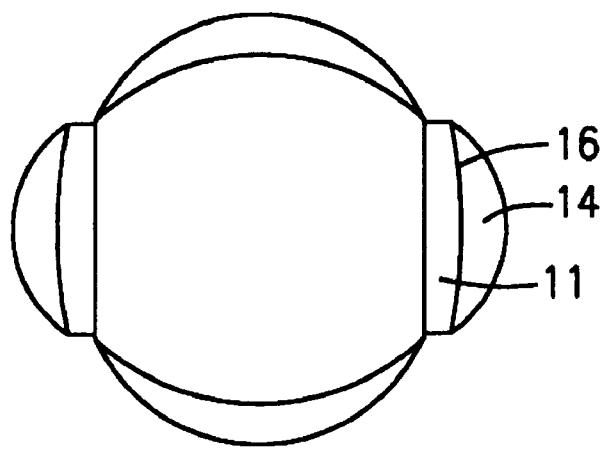
FIG. 6 is a cross sectional view of the finger gripping portion of the handle of the present invention.
Figure 7:
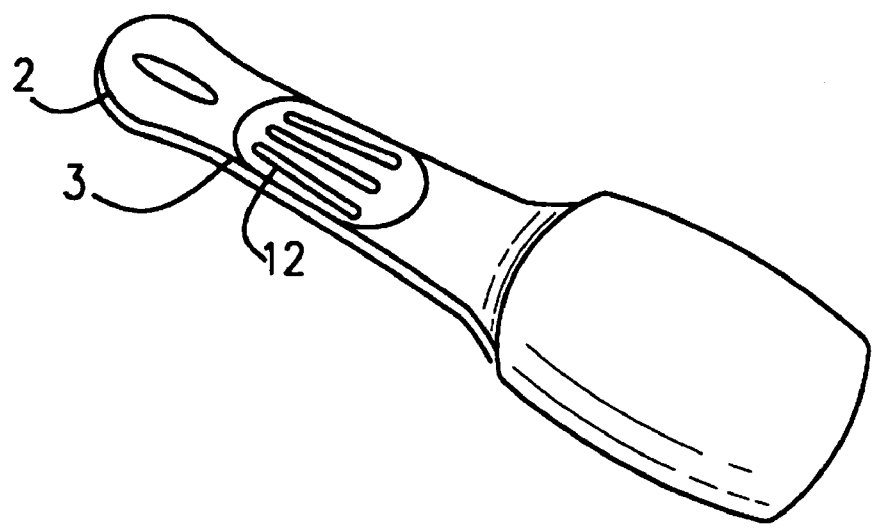
FIG. 7 is perspective view of an embodiment of a spatula, having the handle of the present invention.
Figure 8:
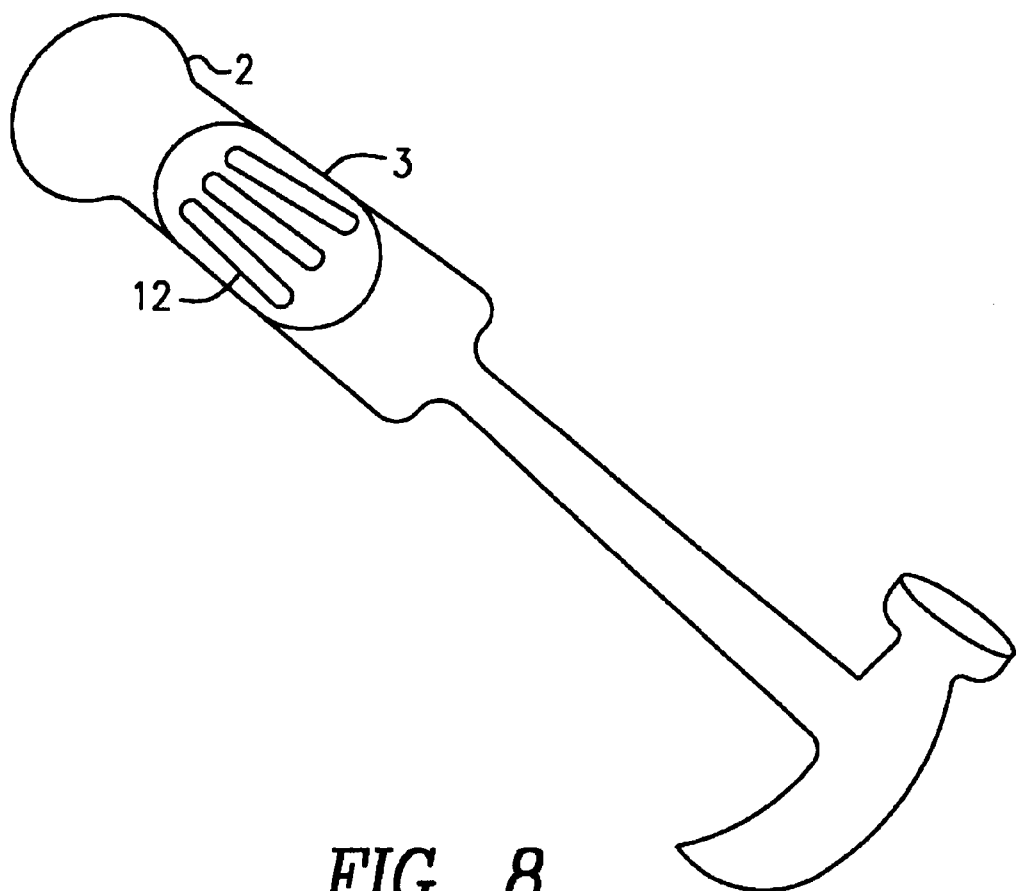
FIG. 8 is a perspective view of an embodiment of a hammer having the handle of the present invention.

Referring to FIG. 4, there is shown a top view of cushioning member 4. The concave layer 9 is preferably provided with raised portions 12 to assist in the gripping by the fingers of the user. Referring to FIG. 5 there is provided a cross sectional view of cushioning member 4. Cushioning member 4 is seen to comprise two layers, a base layer 8 and a concave layer 9 to provide air pocket 11 therebetween. Ribs 10 extend downwardly into the air pocket 11 from concave layer 9. Of course, alternatively, the ribs could extend upwardly from base layer 8 into air pocket 11 as well, or both the base layer 8 and the concave layer 9 could be provided with ribs.

The cushioning member may be comprised of any elastomer known to those skilled in the art. Typical elastomers are styrene-butadiene copolymer, polychloroprene (neoprene), nitrile rubber, butyl rubber, polysulfide rubber, polyisoprene, ethylene-propylene terpolymers (EPDM rubber), silicone rubber, polyurethane rubbers, mixtures thereof and the like. Preferably the elastomer is translucent and comprises a silicone rubber.

As mentioned above in reference to FIGS. 1–5, the cushioning member may be attached to the handle along two flattened portions of the finger gripping portion of the handle, such as by molding or by the use of a suitable adhesive. In one preferred embodiment, the elastomer employed as the cushioning member is compatible to form a molecular bond with the handle material during the molding process as is known to those skilled in the art. Also contemplated in the practice of the present invention are embodiments where the cushioning member is attached around the entire circumference of finger gripping portion, or further, the cushioning member may be attached along the outside of the entire handle, or any portion thereof as desired. For instance, in the case of a golf club handle, the entire handle portion of the shaft where the palms and fingers of both hands are in contact may be provided with the cushioning member of the present invention for an improved "feel" of the club.

As shown in FIGS. 1–5, the cushioning member is of two ply construction with one air pocket. It is contemplated within the scope of the present invention that additional layers may be employed and additional air pockets, as desired for the particular application. Additionally, the layers and air pockets may be of any configuration desired by the tool designer. Similarly, the thickness of the layers and the air pocket is not critical but is dependent on the particular application and the material used.

In one embodiment for the handle of a frying pan, a two-ply cushioning member is employed, with the material of construction being a silicone rubber, the base layer being from about 0.04 inches to about 0.06 inches, the concave layer each being from about 0.030 inches to about 0.040 inches, the air pocket being about 0.125 inches from base to vertex, and with three equispaced ribs of from about 0.030 inches to about 0.040 inches in length extending downward from the concave layer.

The inclusion of the air pocket between the two layers unexpectedly provides for an improved cushioning and controlled compression on the handle making the tools to which the handle is attached significantly more comfortable to use.

Many variations of the present invention will suggest themselves to those skilled in the art in light of the above-detailed description. All such obvious modifications are within the full intended scope of the appended claims.

All of the above-referenced patents, patent applications and publications are hereby incorporated by reference.

What is claimed is:

1. A handle comprising:
    a rigid handle portion, said rigid handle portion having a finger gripping portion and a palm fitting portion which is relatively thicker than the finger gripping portion, said finger gripping portion including at least one rounded portion adjacent at least one flattened portion;
    a cushioning member, said cushioning member comprising at least a top layer and a bottom layer thereby defining an air pocket in between said top layer and said bottom layer; said cushioning member being attached only along each of the at least one flattened portion of said rigid handle portion.

2. A handle as defined in claim 1 wherein said cushioning member is constructed of an elastomer.

3. A handle as defined in claim 2 wherein said elastomer is selected from the group consisting of styrene-butadiene copolymer, polychloroprene, nitrile rubber, butyl rubber, polysulfide rubber, polyisoprene, ethylene-propylene terpolymers, silicone rubber, polyurethane rubbers and mixtures thereof.

4. A handle as defined in claim 3 wherein said elastomer comprises a silicone rubber.

5. A handle as defined in claim 2 wherein said elastomer is translucent.

6. A handle as defined in claim 1 wherein said bottom layer of said cushioning member is attached to said flattened portion by an adhesive.

7. A handle as defined in claim 1 wherein said bottom layer of said cushioning member is attached to said flattened portion by molding.

8. A handle as defined in claim 1 wherein said bottom layer of said cushioning member comprises ribs which extend upwardly into said air pocket.

9. A handle as defined in claim 1 wherein said top layer of said cushioning member comprises ribs which extend downwardly into said air pocket.

10. A handle as defined in claim 1 wherein said top layer further comprises indentations on the outer surface of said top layer.

11. A handle as defined in claim 1 wherein said cushioning member further comprises a middle layer and a second air pocket between said middle layer and said top layer.

12. A kitchen tool comprising the handle as defined in claim 1.

13. A handle as defined in claim 1 wherein said finger gripping portion comprises two flattened portions and two rounded portions.

14. A kitchen tool comprising a handle and a work end, said handle comprising:
    a rigid handle portion, said rigid handle portion having a finger gripping portion and a palm fitting portion which is relatively thicker than the finger gripping portion, said finger gripping portion including at least one flattened portion and;
    a cushioning member, said cushioning member comprising at least a top layer and a bottom layer thereby defining an air pocket in between said top layer and said bottom layer, said cushioning member being attached only along each of the at least one flattened portion of said rigid handle portion.

15. A handle as defined in claim 14 wherein said cushioning member is constructed of an elastomer.

16. A handle as defined in claim 14 wherein said elastomer is selected from the group consisting of styrene-butadiene copolymer, polychloroprene, nitrile rubber, butyl rubber, polysulfide rubber, polyisoprene, ethylene-propylene terpolymers, silicone rubber, polyurethane rubbers and mixtures thereof.

17. A handle as defined in claim 14 wherein said cushioning member further comprises, a middle layer and a second air pocket between said middle layer and said top layer.

18. A handle as defined in claim 14 wherein said bottom layer of said cushioning member is attached to said flattened portion by an adhesive.

19. A handle as defined in claim 14 wherein said bottom layer of said cushioning member is attached to said flattened portion by molding.

20. A hardware took comprising a handle and a work end, said handle comprising:

a rigid handle portion, said rigid handle portion having a finger gripping portion and a palm fitting portion which is relatively thicker than the finger gripping portion, said finger gripping portion including at least one flattened portion and;

a cushioning member, said cusioning member comprising at least a top layer and a bottom layer thereby defining an air pocket in between said top layer and said bottom layer, said cushioning member being attached only along each of the at least one flattened portion of said rigid handle portion.

\* \* \* \* \*